United States Patent [19]

Thompson

[11] Patent Number: 5,181,615

[45] Date of Patent: * Jan. 26, 1993

[54] PLASTIC CLOSURES FOR CONTAINERS AND CANS AND METHODS OF AND APPARATUS FOR PRODUCING SUCH CLOSURES

[75] Inventor: Mortimer S. Thompson, Maumee, Ohio

[73] Assignee: Innovative Closures, Inc., Maume, Ohio

[ * ] Notice: The portion of the term of this patent subsequent to Dec. 4, 2007 has been disclaimed.

[21] Appl. No.: 583,290

[22] Filed: Sep. 17, 1990

Related U.S. Application Data

[62] Division of Ser. No. 115,445, Oct. 30, 1987, Pat. No. 4,975,132.

[51] Int. Cl.$^5$ ............................ B65D 6/28; B65D 7/16
[52] U.S. Cl. ................................. 220/618; 156/69; 220/619; 220/620; 220/DIG. 16
[58] Field of Search ................. 53/485–488; 156/69; 220/611, 614, 615, 619, 620, 618; 229/5.5, 5.6, 5.7, 125.35; 413/4, 6

[56] References Cited

U.S. PATENT DOCUMENTS

| | | | |
|---|---|---|---|
| 2,894,844 | 7/1959 | Shakman | 220/624 |
| 3,369,694 | 2/1968 | Mauser et al. | 220/611 |
| 3,385,249 | 5/1968 | Czarnecki | 413/6 |
| 3,402,873 | 9/1968 | Lauterbach, Jr. | 229/125.35 |
| 3,428,238 | 2/1969 | Shelby et al. | 220/619 |
| 3,524,568 | 8/1970 | Nughes | 220/611 |
| 3,543,963 | 12/1970 | Heisler | 220/611 |
| 3,586,204 | 6/1971 | Roper | 220/619 |
| 3,709,399 | 1/1973 | Nughes | 220/611 |
| 3,977,153 | 8/1976 | Schrenk | 53/485 |
| 4,088,086 | 5/1978 | Miller et al. | 413/6 |
| 4,102,467 | 7/1978 | Woodlay | 220/611 |
| 4,184,444 | 1/1980 | Woodley | 413/6 |
| 4,333,584 | 6/1982 | Gall | 220/619 |
| 4,365,724 | 12/1982 | Walden | 220/611 |
| 4,392,295 | 7/1983 | Sasai et al. | 220/620 |
| 4,484,964 | 11/1984 | Kawamata | 229/5.7 |
| 4,561,555 | 12/1985 | Miller | 220/611 |
| 4,626,157 | 12/1986 | Franek et al. | 413/6 |
| 4,626,158 | 12/1986 | Le Bret | 413/6 |
| 4,667,384 | 5/1987 | Miller | 413/5 |
| 4,692,132 | 9/1987 | Ikushima et al. | 229/5.6 |
| 4,697,972 | 10/1987 | Le Bret | 220/619 |
| 4,872,304 | 10/1989 | Thompson | 53/488 |

Primary Examiner—Jimmy G. Foster
Attorney, Agent, or Firm—George P. Hoare, Jr.

[57] ABSTRACT

A container or can having a body and end portion which include plastic free ends and which are joined and sealed by cooperatively curling the juxtaposed ends. The body portion has an opening surrounded by a free end suitable for curling. The container end portion has a generally flat or dish shaped central lid portion with a peripheral skirt having a free end adaptable to the container body free end and suitable for curling. The container body and end portions are joined by juxtaposing their free ends so that they form a double wall followed by curling with a curling tool to intimately engage the ends and concurrently curve the perimeters thereof to one another in a tightly curled configuration.

15 Claims, 7 Drawing Sheets

PLASTIC CLOSURES FOR CONTAINERS AND CANS AND METHODS OF AND APPARATUS FOR PRODUCING SUCH CLOSURES

This is a divisional of application Ser. No. 07/115,445, filed Oct. 30, 1987 now U.S. Pat. No. 4,975,132.

FIELD OF THE INVENTION

This invention relates to a container having a plastic closure and to a method of and apparatus for forming the same. Particularly, this invention relates to a plastic can bodies and ends and to methods of and apparatus for forming the same.

BACKGROUND OF THE INVENTION

The need for containers and cans of plastic has been recognized more and more as environmental concerns grow and new technologies are finding acceptance in the marketplace. For instance, recycling of packaging materials has imposed restrictions on those packages consisting of more than a single material wherein the various components cannot be easily separated in the recycling process. As a result, cans of aluminum are considered satisfactory but cans of plastic which are closed by metal ends or reinforcing members are not.

Also the advent of oven heating employing microwave energy introduces another problem to all-metal cans or to plastic cans with metal ends in that the metal acts to build up a high electrical potential which can discharge or spark to other metallic surfaces including the oven walls.

Additional problems exist with food products which are heated in plastic packages during autoclaving related to the distortion of the walls or ends resulting from the higher temperatures and internal pressure buildup. Since the package typically cannot be vented, care must be taken to provide and adequately control the external pressure to balance the internal pressure buildup and when concave can ends are bowed outwardly, another operation of bowing them back to their original shape may be required.

Other problems exist with food products which are heated in their containers, especially in microwave ovens, related to venting the package so that messy splattering does not result. Puncturing the lids of such packages exposes the contents and permits splattering to occur. Yet without such puncturing the package can distort and even burst open as a result of internal pressure buildup. Prior to the present invention, moreover, techniques used to join metal can ends to can bodies of metal generally have been directed to sequentially and circumferentially rolling their free ends together. In one method the rolling tool first sequentially and circumferentially curls the seamed free ends together, followed by a flattening or squeezing operation to bring the curled surfaces into a more intimate engagement suitable for sealing. Without the latter operation the curls produced are not tight enough to make a good seal. In another method rolling tools directly but still sequentially and circumferentially fold the free ends in separate operations into a tight flattened shape suitable for sealing without a prior curling operation.

In one effort to form plastic cans Heider et al (U.S. Pat. No. 3,543,963) discloses a seamed plastic can end and plastic can body sequentially and circumferentially folded, bent and reshaped by a sequential rolling and folding process. This is relatively complicated and cumbersome and can be time consuming. Further it appears the technique proposed by the Heider et al in 1970 has not met with commercial acceptance.

Rather those in the art have had to resort to using metal can ends seamed to the free ends of plastic container bodies by folding, bending and reshaping the ends with sequential and circumferential rolling techniques.

Thus, there is a persisting need to provide satisfactory containers and cans comprising plastics, particularly at the seams formed by an end and adjacent body portion of the container.

SUMMARY OF THE INVENTION

In accordance with the present invention, there is provided a new and unique container and method of and apparatus for producing it which facilitates recycling after use; is suitable for microwave heating; can be retorted without yielding permanent bulges; possesses a high degree of sealing integrity for products which are pressurized or under vacuum; employ internal pressure or vacuum to enhance their sealing integrity; can be employed to package products at high throughput rates and are inexpensive. The container includes a body and end portion which include plastic free ends which are joined and sealed by cooperatively curling the juxtaposed ends. The body portion has an opening surrounded by a free end suitable for curling. The container end portion has a generally flat or dish shaped central lid portion with a peripheral skirt having a free end adaptable to the container body free end and suitable for curling. The container body and end portions are joined by juxtaposing their free ends so that they form a double wall followed by curling with a curling tool to intimately engage the ends and concurrently curve the perimeters thereof to one another in a tightly curled configuration.

In a preferred embodiment the container is a can and the can body comprises plastic and has means below its free end to positively locate a can end comprising plastic and to restrict relative axial movement of the can end during the curling operation. The preferred plastic can end and/or body has a generally "U" shaped peripheral recess adjacent the free ends to cooperate with a die curling tool during the joining operation to produce the curled portion and/or to thereafter cooperate with the curled portion to restrict its movement or any uncurling which might result from its elastic memory, from stresses imposed by internal pressure within the can or from other sources. The can end is shaped so that a wall of the recess expands under the influence of internal pressure to positively transmit said pressure beneficially against the curled portion to further hold it in position and maintain its joining and sealing integrity. Alternatively the can end can be shaped so that the same effect can be accomplished employing the external pressure developed with vacuum packed products.

In another embodiment of the invention one of the free ends of plastic is mechanically stronger than the other so that during curling the weaker of the free ends is urged to conform to it to assure a suitable seal therebetween. Alternatively or additionally one of the free ends of plastic has a greater amount of elastic memory than the other so that it is constantly urged to form an intimate interfacial contact therebetween suitable for sealing.

In still another embodiment, to enhance the joining and maintain the sealing integrity of the curled portion, the free ends of plastic are welded together or the curled portion is crimped in a manner which will produce a shape which is tighter, stronger and more resistant to any uncurling which might occur as a result of elastic memory or internal pressure.

In yet another embodiment to maintain the sealing integrity of the curled portion a sealant may be included to seal the inner void portion of the curl or the interfaces of the coiled plastic free ends.

Also, the curled free ends of the invention may be of different plastic compositions to promote slippage therebetween and a resultant greater intimacy of their interfaces for sealing. Or the plastic used may be of the same composition but include components which reduce sliding friction therebetween. Further the curled portion can include relatively soft and conformable surfaces to further enhance its sealing integrity.

In forming the can body of the invention, processes such as the seaming of sheet or the use of extruded sleeves to which can ends are affixed, may be used in practicing the present invention. Alternatively the can body may be produced as a unit by injection molding, blow molding including stretch blow molding, thermoforming including solid phase pressure forming, various forms of compression molding including impact molding, or other means. The can end can also be formed by processes such as injection molding, thermoforming including solid phase pressure forming, various forms of compression molding including impact molding, or other means.

In the preferred method of the invention, the can end is first inserted into the open end of the can body so that the periphery of its lid portion abuts the inwardly projecting locating means of the can body and so that the plastic free end of the can end extends upwardly in juxtaposition to the plastic free end of the can body forming a double wall. Preferably the free ends form an interference fit, one within the other. The two can portions are then joined and sealed by a die curling tool which preferably engages the breadth or periphery of the free ends in vertical compression at the same time and concurrently turns them inwardly or outwardly and then downwardly, channeling and altering the direction of such movement over its working surfaces. The curling action at this point produces an inverted J or U shape in the free ends. To complete the coiled or curled shape, after leaving the working surface of the tool, the free ends of plastic turn back toward themselves which results from the continuing compression, the stresses imposed by their plastic memory and the shape of can end recess. Further compression forces the free ends to continue to curl until a tight coil has been permanently formed within the peripheral recess of the can end where it is held in place by the wall of said recess. Preferably the working surfaces of the curling tool are curved but a plurality of flat surfaces may be used.

Additionally, the working surfaces of the curling tool may be heated to facilitate the curling operation or to preferentially heat one of the plastic free ends so that the other plastic free end will have a greater amount of residual elastic memory and therefore constantly urge itself against its opposing free end in an intimate sealing engagement. Also the working surface of the tool may be vibrated or rotated during the curling operation to promote slippage of the outside free end over its surface or to generate heat therein to enhance the curl tightness and sealing integrity. Alternatively the can end of plastic may be rotated relative to the can body before curling to heat both free ends of plastic to promote their sealing contact, to reduce their elastic memory and tendencies to uncurl or to physically weld the two ends to one another. In another embodiment, the juxtaposed free ends of plastic may be welded by other means or bonded together prior to, during or after the curling operation to enhance the tightness of the curl and to provide a tighter seal. The welded or bonded area may include one or both of the lips of the free ends, the exposed crevice created by the curled portion and the can end or body after curling, or other segments of the curled portion.

In another embodiment a sealant may be applied prior to curling to the curling tool or a surface of the can end or body where it is subsequently distributed along the plastic free end interface and/or the central void region of the curled portion.

In still another embodiment the sealant may be applied to the exterior crevice formed by the curled portion with the can preferably prior to the formation of a pressure differential wherein an internal vacuum acts to pull said sealant into said crevice.

Also, the curled portion may be crimped to form a series of vertical impressions or one or more circumferential impressions around its periphery, an operation which may include heat to further "set" the resulting deformation or to weld one free end to the other thereat.

The curled joining means of the invention differ from that typically used for joining can ends to can bodies in that the interface between the can end and body free ends after curling produces an intimate sealing engagement in itself and does not rely on a flattening bending or folding operation to do so. In the invention the integrity of the sealing engagement comes from the easy conformability of the plastic surfaces firstly because of their softer nature and secondly because during the curling process they adapt readily to one another. The curling process imposes pressure and can impose heat to facilitate this conformability. This is enhanced and assured by an interfering, plug type fit of the free ends before curling. The resistance to uncurling is also enhanced by additional provisions which create a tighter cross section by employing rotation to the curling surface relative to the free ends and/or welding or crimping of the free ends or the resultant curl.

The curling means of the invention can be accomplished at high rates largely because the curling of the entire free ends takes place essentially at the same time. The crimping means of the invention is feasible because it is practiced on an already curled and sealed shape and is also a mechanical process which can operate at high rates. The welding operations of the invention can be practical at high rates because they are supplementary to the curling process which produces the basic joining and sealing shape and are used primarily to fix the curl so that the sealing engagement is not subsequently lost as a result of uncurling.

BRIEF DESCRIPTION OF THE DRAWINGS

The following is a detailed description together with accompanying drawings of illustrative embodiments of the invention. It is to be understood that the invention is capable of modification and variation apparent to those skilled in the art within the spirit and scope of the invention.

FIGS. 7-9 are longitudinal sectional views illustrating a preferred method of the invention for forming plastic containers, such as the container of FIGS. 1, 5 and 6 wherein FIG. 7 illustrates the assembly and juxtaposition of the free ends ready for engagement by the die curling tool, wherein FIG. 8 illustrates the concurrent engagement between the die curling tool of the perimeters of the free ends and the curling of the engaged free ends by the die, and wherein FIG. 9 illustrates the completion of the concurrent curling of the perimeters of the free ends by the die tool method of the present invention;

DETAILED DESCRIPTION OF THE DRAWINGS

Figures 1, 2:
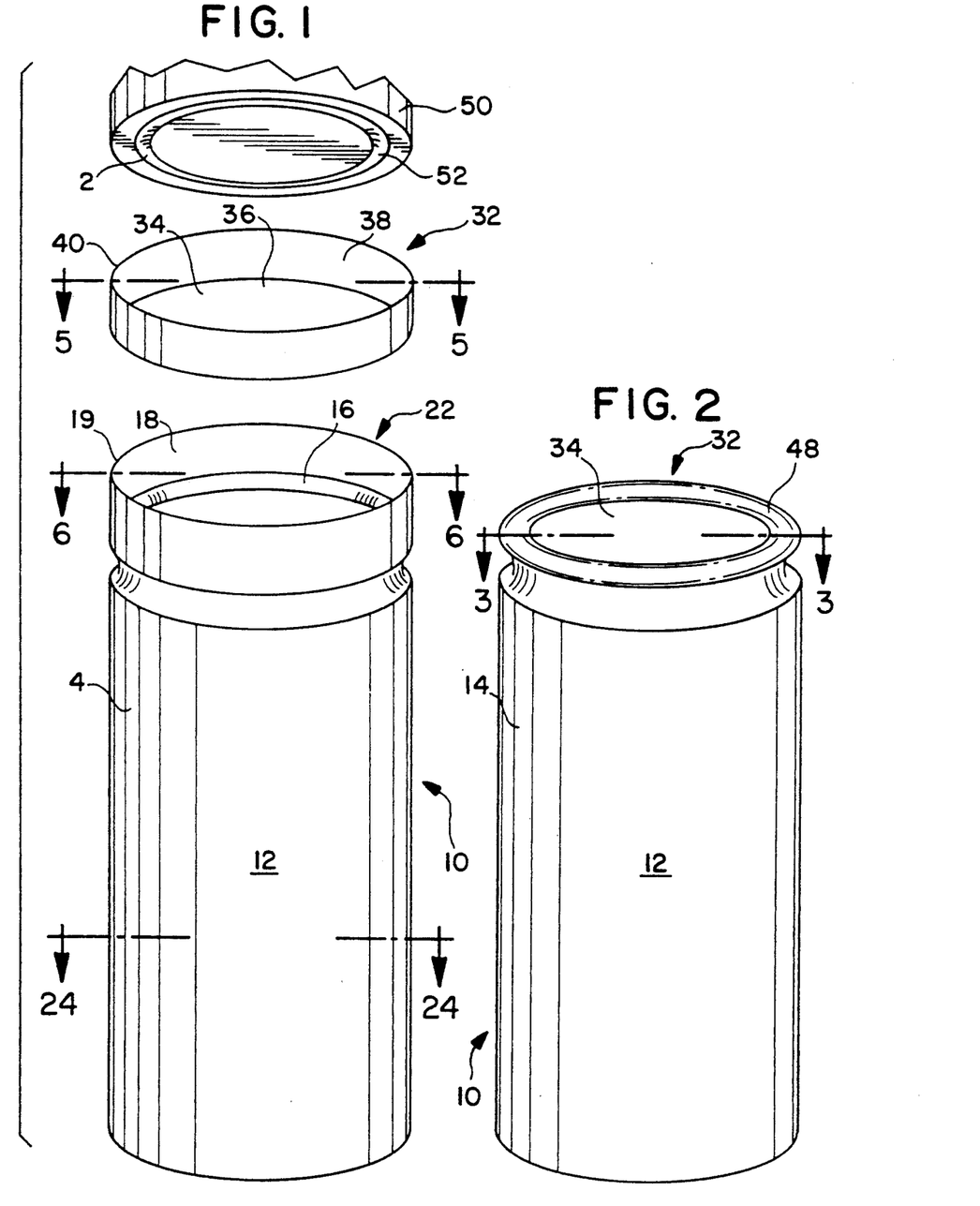
FIG. 1 is an exploded perspective view of a preferred embodiment of the preform of the invention and the preferred die curling tool of the invention prior to assembly of the illustrated plastic container and engagement by the die curling tool.
FIG. 2 is a perspective view of the container of FIG. 1 after assembly and die curling of the juxtaposed free ends of the plastic end and plastic container body.
Figure 3:
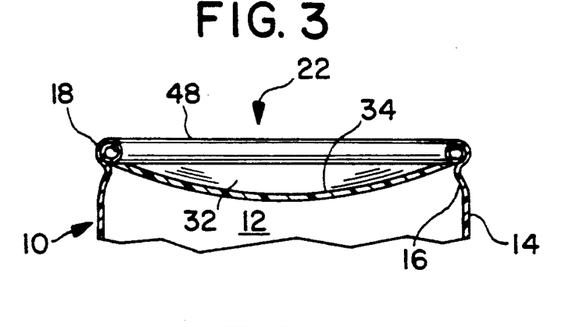
FIG. 3 is a longitudinal sectional view, of the container of FIG. 2, taken along the lines 3—3 thereof.
Figure 4:
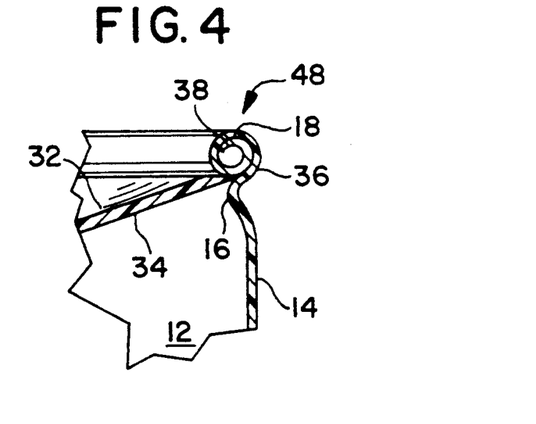
FIG. 4 is an enlarged detailed view of the curled free ends of the container body and end.
Figure 5:
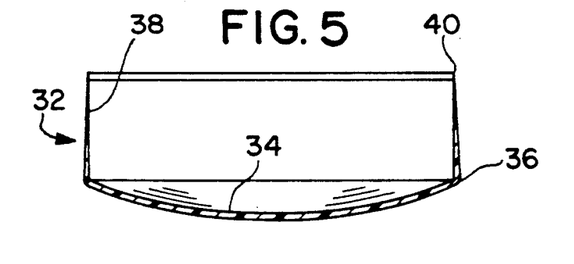
FIG. 5 is a longitudinal sectional view of the preform of the container end, taken along lines 5—5 of FIG. 1.
Figure 5A:
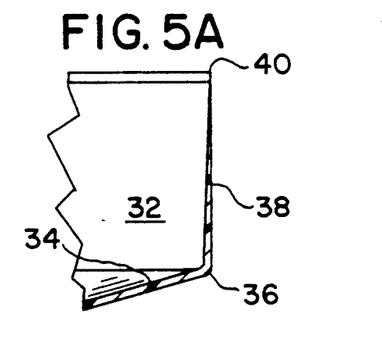
FIG. 5A is an enlarged detailed view of FIG. 5.
Figure 6:
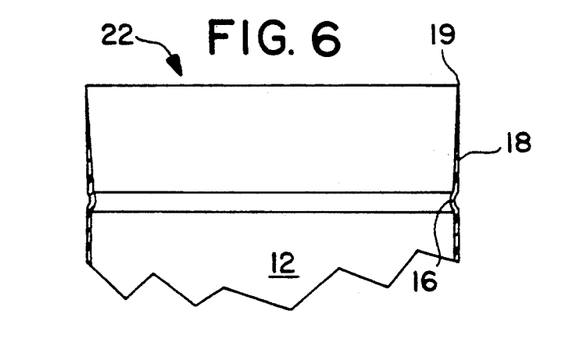
FIG. 6 is a longitudinal sectional view of the preform of the container end, taken along lines 6—6 of FIG. 1.
Figure 6A:
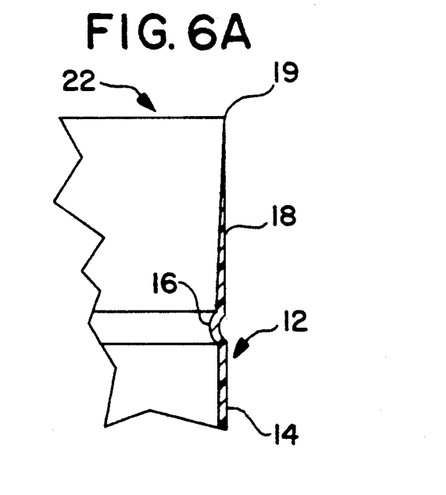
FIG. 6A is an enlarged detailed view taken of FIG. 6.

Referring to FIGS. 1 to 4, there is shown a container which is a can 10 having a body 12 and an end 32 of plastic. The can body 12 includes a tubular wall 14, an inwardly directed projection 16 which may be continuous or discontinuous, and a free end 18 with a lip 19 defining an opening 22. The can end 32 has an upwardly concave lid 34 with a peripheral portion 36 and an annular free end 38 with a lip 40. FIGS. 2-4 show the can end joined to the can body in a sealing engagement created by tightly curling their juxtaposed free ends 18 and 38 into a double walled curled or coiled portion. FIGS. 5 to 6A show the respective can end 32 and can body 12 of plastic prior to assembly and joining, wherein the free end 38 and 18 are tapered to facilitate curling.

Referring to FIGS. 1 and 7 to 9, there is shown a preferred apparatus and method for joining the can end 32 and can body 12 with the die curling tool 50.

Figure 7:
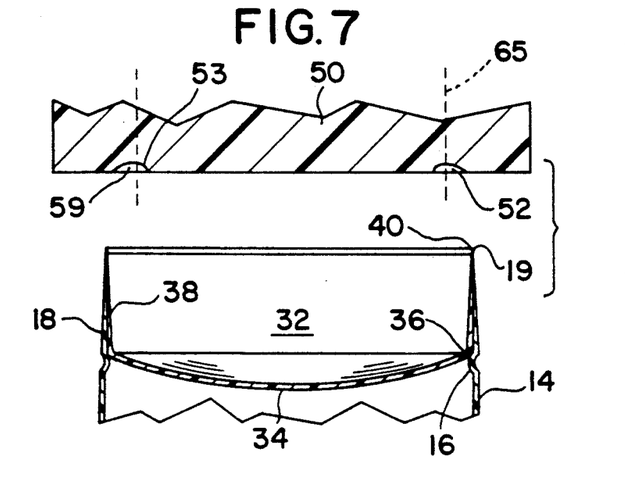

In FIG. 1, the can end 32 and can body 12 are ready for assembly and the die curling tool 50 is ready to engage and curl the assembled double wall free ends 18 and 38. In FIG. 7 the can end 32 has been assembled with the can body 12 ready for curling by snapping it into and nesting it in the can body opening 22 so that the lid peripheral portion 36 rests against the can body projection 16 and its free end 38 is in juxtaposition with and within the can body free end 18. Preferably the free ends 18 and 38 are in an interfering and sealing engagement along their full length and may include a snapfit engagement. Positioned directly above the annular free ends 18 and 38 is the tool 50 having an annular groove 52 with a concave cross section suitable for producing the curled portion 48.

Figure 8:
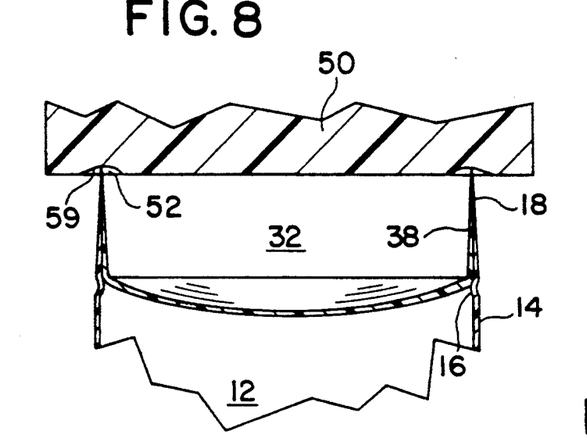
Figure 9:
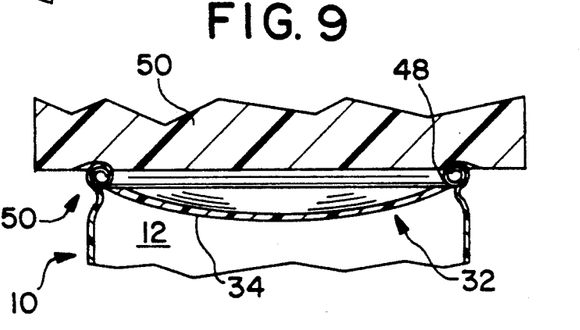

As shown in FIGS. 8 and 9, the joining and sealing operation is accomplished by pressing the groove 52 of the tool 50 against the tapered lips 40 and 19 of the free ends 38 and 18. The engagement between the walls of the groove 52 and each of the free ends 38 and 18 occurs about their perimeters at one time. In this embodiment the deepest portion 53 of the groove 52 representing the center of its concavity is located inwardly of the cylindrical plane of the free ends 38 and 18. This is illustrated by the dotted lines 65 of FIG. 7. Also the groove 52 has a beveled portion 59 outwardly and tangent to its concavity to facilitate centering of the tool and can free ends. As movement of tool 50 relative to the free ends 38 and 18 continues, the free end 38 and 18 are centered within groove 52 by the slanted portions 59 and are concurrently forced about each of their perimeters inwardly and then downwardly to assume an interim inverted "J" shape as shown in FIG. 8. As this relative movement continues, the annular lips 40 and 19 are forced downwardly about each of their perimeters out of the groove 52 and at the same time are forced outwardly in response to the stresses developed therein while being shaped by the tool 50, thereby producing the desired double walled curl 48 joining and sealing the can end 32 to the can body 12.

To facilitate the curling operation, the tool 50 may be heated to a temperature of about ambient to about the melting point of the plastic used. Curling cycles may range from about two-tenths to four seconds for typical free end thicknesses of up to 0.020 inches. Higher temperatures are preferred to minimize the elastic strain imposed by the curling operation on the plastic and to maximize the tightness of the curl, especially when short curling cycles are used. Alternatively or additionally the curling operation may also be facilitated by vibrating or rotating the tool 50 so that the free end 18 slides more readily over the working surface 52 and/or frictional heat is developed therein. Or the can end 32 may be rotated relative to the can body 12 before or during the curling to heat both free end 38 and 18 to facilitate the curling operation, to promote their intimate sealing contact, to reduce elastic memory and resultant uncurling and/or to physically weld the ends to one another.

As shown in FIGS. 5 AND 6, there is a taper in the free ends 18 and 38 extending from their lips 19 and 40 which facilitates the initiation of the curled portion 48. The taper preferably extends from lips 19 and 40 for a distance sufficient to assure a full round curve to the curl 48 adjacent its lips 19 and 40 and to program the development of compressive stress on the free ends 18 and 38 to avoid their collapse during short curling cycles. For a typical curl 48 of the invention having a width of 0.070 inches, the taper may be sharp and extend a distance of about 0.050 inches from the lips 19 and 40 or they may be gradual and extend the whole length of the free ends 18 and 38 or both. Typical average thicknesses of the free ends 18 and 38 range between 0.003 and 0.020 inches. As shown in FIGS. 5 and 6, the free ends 18 and 38 are free of abrupt changes in thickness.

Preferably the free ends 18 and 38 have different levels of mechanical strength so that one free end will be shaped by and in more intimate contact with the other. For example the can end free end 38 may be thinner and more readily formed than the can body free end 18 so that it more readily conforms to the specific curvature developed in the thicker free end. Or, in another example, the can body free end may be of comparable thickness but made mechanically less strong and more formable by employing high temperatures in tool 50.

Preferably one free end will have a lower amount of elastic strain or memory than the other free end so that the latter will constantly urge itself against the first free end thereby promoting the sealing engagement. This can be accomplished by using high tool temperatures to preferentially relax such elastic strain in the can body free end 18 because it is in direct contact with the tool 50 during curling while the can end free end 38 is insulated from the tool 50 by the body free end 18.

Useful plastics which can be used for the free ends of the container bodies and ends of the invention include polyolefins, such as polypropylene and polyethylene, polyethylene terephthalate, polystyrene, acrylonitriles-tyrene-butadiene polymer, nylon, acetal polymer, polycarbonate, nitrile resins, polyvinyl chloride, polysulfone and other semi-rigid to rigid polymers including multipolymers, polymer blends and polymer laminar constructions thereof having enhanced properties such as barrier to gases, heat resistance, etc.

Further the container body may include a wholly different polymer than the container end or may include different ingredients such as flow or slip aids in a similar polymer.

The container body or end may also include composite constructions including paper, metal films or other materials which are used at low enough levels so that the curl formability of the free ends is sufficient to produce the curled seams of the invention. The containers of the present invention can be used to contain a wide variety of products including:

beverages, including fruit juices, carbonated soft drinks and pasteurized beverages such as beer;

and foods, especially those which are hot packed, retorted or intended to be microwaved in the container and including vegetables, meat products, soups and other processed foods.

Further, the shape of the containers may be other than generally cylindrical and may include oval or square horizontal cross sections and tapered, curved or otherwise sculptured vertical cross sections.

Figure 10:
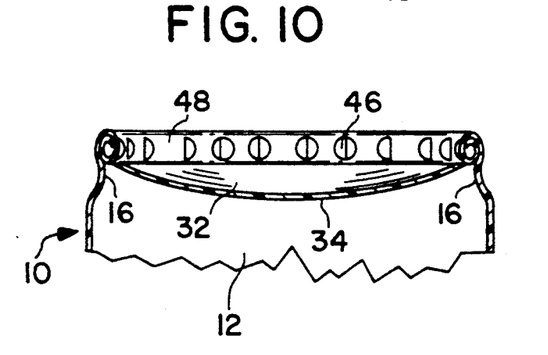
FIG. 10 is a longitudinal sectional view of another embodiment of the invention, wherein the curled free ends have been crimped.
Figure 10A:
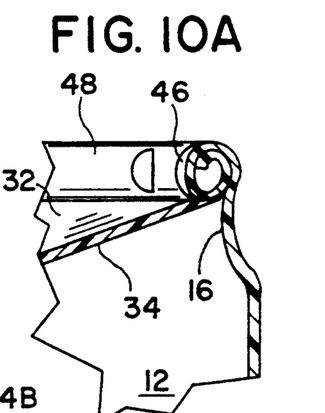
FIG. 10A is an enlarged detailed view of the curled and crimped ends of the container of FIG. 10.
Figure 11:
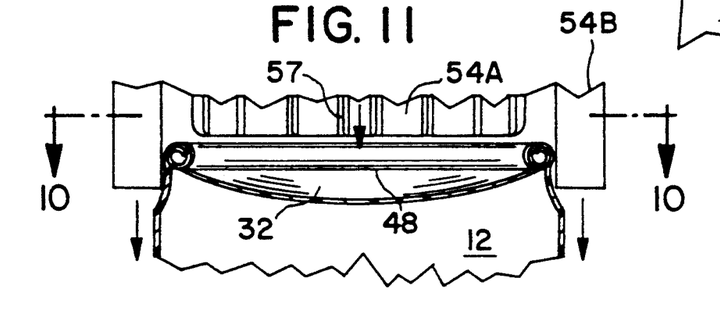
FIG. 11 is a longitudinal sectional view illustrating a preferred apparatus and method of the invention for crimping the curled free ends of a container, such as illustrated in FIG. 10.
Figure 12:
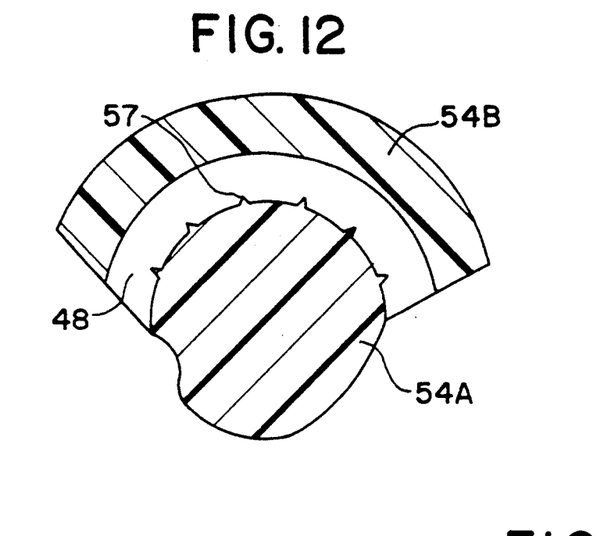
FIG. 12 is a cross sectional view of the crimping apparatus of FIG. 11, taken along the lines 12—12 thereof.

Referring now to the other illustrative embodiments of the inventions, FIGS. 10 to 12 show another embodiment of the invention where the double walled curled portion 48 which joins and seals the can end 32 to the can body 12 is crimped in a subsequent operation. FIG. 10 shows the can 10 of FIGS. 1 to 9 having a curled portion 48 including spaced vertical indentations 46 around its internal periphery produced by crimping. The indentations 46 create a tighter curled portion 48 thereat to reduce any tendency to uncurl in use. FIGS. 11 and 12 show a tool 54 and a method to produce the crimping. The tool 54 has a central portion 54A having spaced vertical projections around its lower periphery and a ring portion 54B concentrically spaced from it. During the crimping operation the ring portion 54B is moved downwardly in peripheral abutment with the outer wall of curled portion 48 while the tool central portion 54A is forced in peripheral engagement with the inner wall of curled portion 48 thereby creating indentations 46 by the tool projections 57. In addition the central tool portion 54A can be heated so that the projections 57 melt the plastic to create welds at the indentations 46 to further enhance its resistance to uncurling in use. Or less elevated temperatures may be used which simply soften the plastic to produce more pronounced indentations and a tighter curled portion 48 thereat. In another embodiment the crimping tools 54A and 54B may be separate parts of the curling tool 50 and the crimping operation may be combined with the curling operation as a sequential step. Additionally the crimping may be located on the outer periphery of the curled portion 48. Also the tools 54A and 54B may be replaced by rollers to produce the vertical indentations 46.

Figure 13:
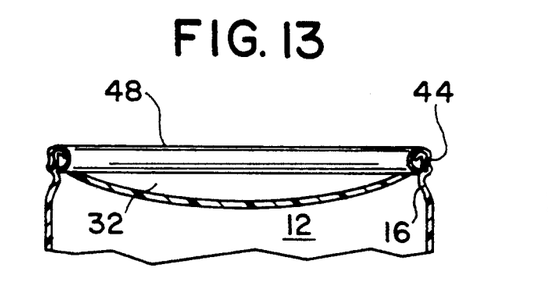
FIG. 13 is a longitudinal view of still another embodiment of the invention, wherein the curled free ends have been creased.
Figure 14:
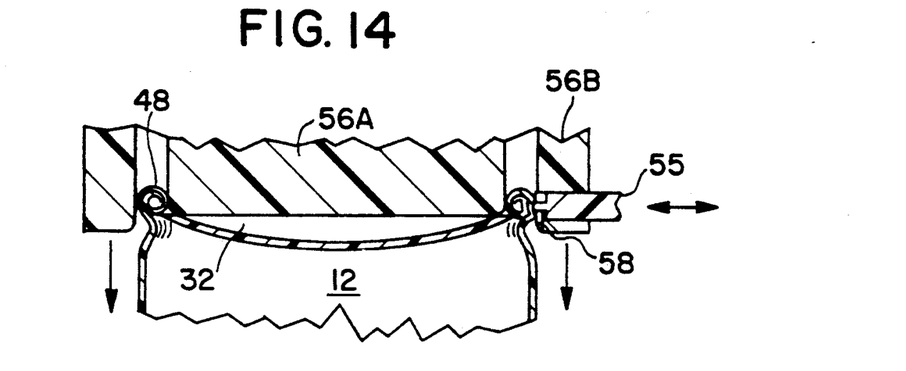
FIG. 14 is a longitudinal sectional view, illustrating a preferred embodiment of the apparatus and method of the invention for creasing the curled free ends of the containers of the invention.

FIGS. 13 and 14 illustrate another embodiment of the invention whereby the double walled curled portion 48 is creased circumferentially in a subsequent operation to increase the tightness of the curl and to resist any uncurling tendency in use. FIG. 13 shows the can 10 of FIGS. 1 to 9 having a curled portion 48 including a circumferential indentation 44. FIG. 14 shows the tool 56 to produce the indentation 44 having a cylindrical central portion 56A and a peripherally spaced portion 56B including a radially movable segment 55 in full engagement with the curled portion 48. The segment 55 which may be heated, has a sharply curved tip 58 which deeply impresses the curled portion 48 to produce the crease 44 while the tool portion 56B is rotated. The sharp crease 44 more effectively overcomes the elastic memory of the plastic curled portion 48 than a flattening operation typically employed after roll curling, thereby producing a tighter structure and seal. Also the tool portion 56B and its segment 55 may be replaced by a roller to produce the circumferential crease 44.

Figure 15:
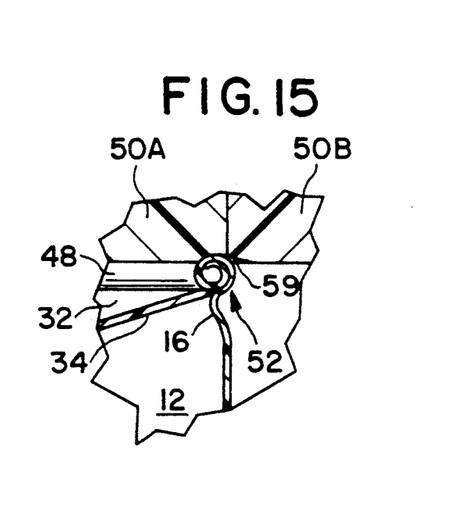
FIG. 15 is an enlarged and detailed longitudinal sectional view of still another embodiment of the invention, illustrating a preferred embodiment of the apparatus and method of flattening the curled free ends of the containers of the invention.
Figure 16:
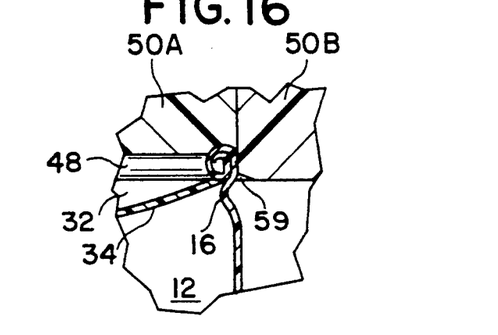
FIG. 16 is similar to FIG. 15 and illustrates how the curled free ends are flattened by the apparatus and method of the invention.

FIGS. 15 and 16 show how the curled portion 48 may be compressed in an operation directly after curling by employing the curling tool 50. FIG. 15 shows the curling tool 50 after the curled portion 48 has been formed including a central component 50A and a peripheral component 50B with an annular groove 52 at their interface having a beveled portion 59. FIG. 16 shows the subsequent axial movement of tool component 50B which may be heated while the curled portion 48 is still contained in the groove 52 to compress it thereby increasing its tightness and resistance to uncurling in use.

Figure 17:
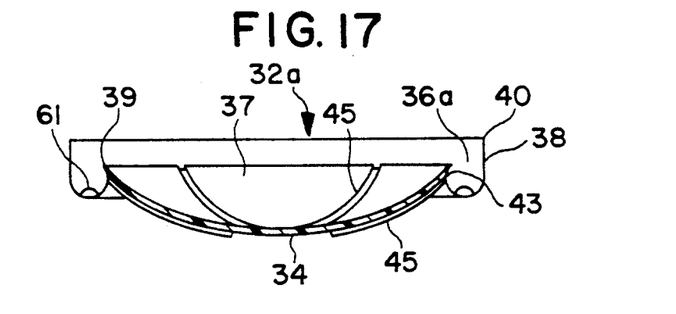
FIG. 17 is a longitudinal sectional view of another embodiment of the container end of the invention which includes means for dynamically maintaining the curled free ends of the container.
Figure 18:
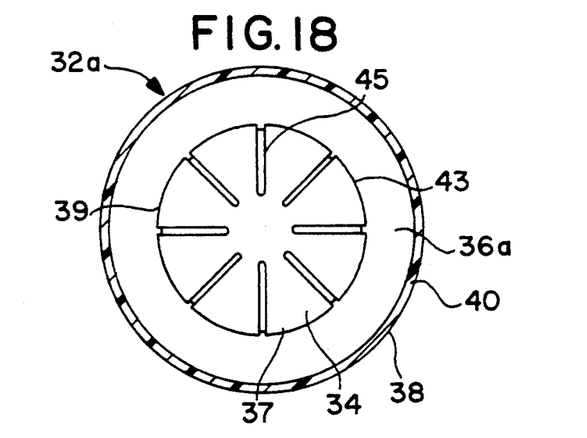
FIG. 18 is a plan view of the container end of FIG. 17.
Figure 19:
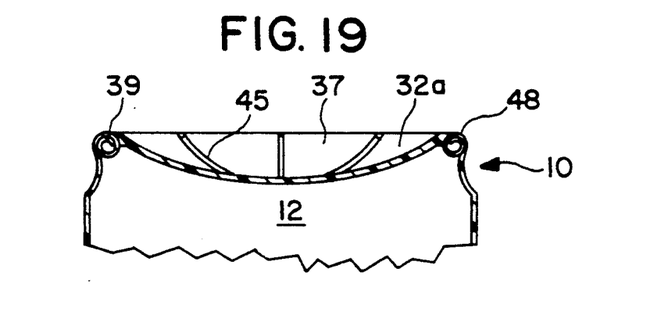
FIG. 19 is a longitudinal sectional view of the container end of FIGS. 17 and 18 assembled with a container body and forming therewith the double wall curl of the present invention.
Figure 20:
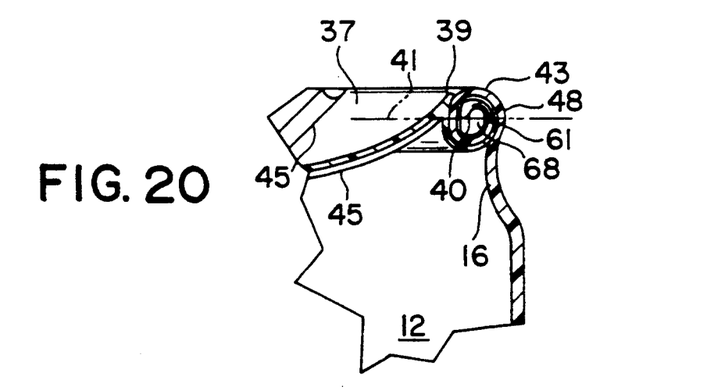
FIG. 20 is an enlarged detailed view of FIG. 19 illustrating that a sealant also can be used to maintain the double wall curl of the containers of the present invention.

Referring now to FIGS. 17 and 18 there is shown a preferred can end 32a of the invention having an upwardly concave lid 34 with radial depressions or lines of weakness 45 and a peripheral upwardly concave recess 36a having a free end 38 with a lip 40. The peripheral concave recess 36a has an inner wall 43 with a transition portion 39 between the wall 43 and lid 34. As shown, the recess 36a is concave and forms a groove about the lid 34 which is below the upper peripheral end of the lid 34 and the transition portion 39. In cross section the groove 36a and free end 38 form an inwardly configured J shape integral with the inner wall 43 of the lid 34. FIGS. 19 and 20 show the can end 32a of FIGS. 17 and 18 joined in a sealing engagement with the can body 12 of FIG. 6 using the method described in FIGS. 7 to 9. The double wall curled portion 48 is located in the peripheral lid portion 36a which acts to receive the lips 19 and 40 and their adjacent free ends 18 and 38 during the curling operation where it cooperates with the curling tool 50 to form the curled portion 48. Thereafter the concavity 36a and its inner wall 43 holds the curled portion 48 firmly in place while resisting any tendency for it to uncurl in use. The transition portion 39 can also overhang the curled portion 48 to facilitate this restraint. Additionally, the inner wall 43 is employed advantageously to positively transmit any internal pressure within the can against the curled portion 48 to hold it firmly in a sealing engagement within the concavity 36a. This comes about from the fact that the inner wall 43 extends to and above the midpoint 41 of the cross section of the curled portion 48 indicated by the dotted line, and from the fact that pressure can be transmitted from the interior of the container directly to the curled portion 48 at and above said midpoint 41 through the inner wall 43 (see FIG. 20). In addition the forces developed in the lid portion 34 of can end 32a by internal pressure also facilitate the compression of the curled portion 48 as a result of leveraging the pressure applied to it upwardly to develop a significant outward thrust on its transition portion 39 and thereby on the concavity wall 43. This action is significantly enhanced by the incorporation of radially directed depressions 45 in the lid portion 34 which serve to reduce its hoop strength without substantially diminishing its radial strength so that the lid portions 37 between the depressions 45 are more readily, but uniformly, deflected axially by internal pressure and thereby produce a greater amount of radial deflection of the peripheral transition portion 39 and, in turn, on the inner wall 43 of the concavity 36a and finally on the curled portion 48.

Figure 21:
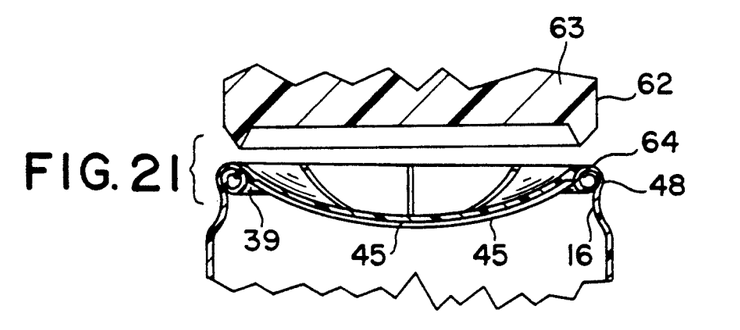
FIG. 21 is a longitudinal view of another embodiment of the invention illustrating a preferred embodiment of an apparatus and method of the invention for welding the double wall curled free ends of the containers of the invention.

FIG. 21 shows how a peripheral weld 64 may be produced between the can body 12 and the can end 32a of FIGS. 19 and 20 at the curled portion 48 to thereby further prevent its uncurling in use and to provide a positive seal therebetween. The peripheral weld 64 is produced by melting the plastic at the interface 64 of the inner wall 43 of the concavity 36a with the curled portion 48 through frictional heat developed by engaging the annular projection 62 of welding tool 63 with the interface 64 and rotating it until enough frictional heat is developed thereat to melt the plastic whereupon the tool 60 is withdrawn and the weld formed. Also, other means may be used to weld the can body 12 to the can end 32a before, during or after the formation of the curled portion 48, including the use of heat developed by friction including spin welding, wave energy, or direct contact with a heated surface or chemically or adhesively bonding. Welds or bonds may also be effectively produced at and between the lips 19 and 40 or along the free ends 18 and 38 before their curling.

Alternatively as shown in FIGS. 17 and 20 sealant 61 may be applied to the concave portion 36a prior to curling so that the lips 19 and 40 will carry it to and fill the central void 68 of the curled portion 48 as well as distribute it along the interface of the free ends during the curling operation(see particularly FIG. 20).

Figure 22:
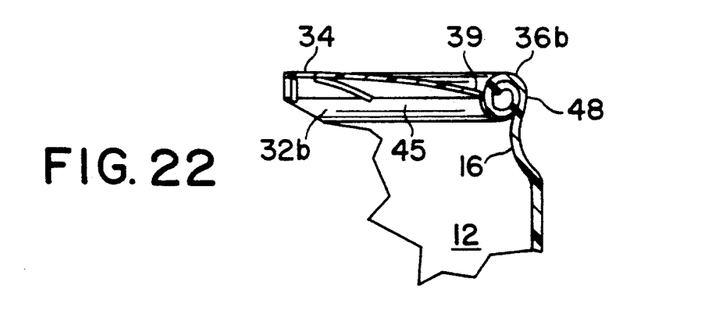
FIG. 22 is an enlarged partial and longitudinal sectional view of a container including the double wall curled plastic free ends of the container body and end having a cover lid which can be flexed inwardly in vacuum packaging.

FIG. 22 shows how the can end 32a of FIGS. 17 and 18 may be modified to work with the can body 12 of the invention when the can is used with an internal vacuum. In this embodiment the can end 32b has a lid 34 which is convex and a transition portion 39 which is located above the midpoint of the curl 48 so that the downward pressure on its surface creates a leveraged radial thrust of its peripheral transition portion 39 on the curled portion 48 located within the concavity 36b, an action which is facilitated by the radial depressions 45 as described in FIGS. 17 to 20.

While the curling method of the invention is directed toward the creation of seams suitable for withstanding significant internal pressure such as that found in carbonated beverages or with retorting, another feature of the invention is that the level of pressure retention can be varied to produce a seam which will vent the container at certain pressure levels by a limited uncurling thereof and then reseal itself as the pressure is vented. In this case it is preferred that the seam consist of curled free ends which are not welded and are without subsequent crimping or creasing and without the provisions illustrated by FIGS. 17 to 20 for employing pressure within the container to restrain the curl portion from uncurling. The unmodified coil shape with its uniform distribution of sealing force and absence of uncurling restraints is a preferred seam shape for this purpose.

Such a venting type seam is advantageous for use with carbonated beverages or non-carbonated products at extremes of pressure build up during distribution or for products which are retorted as well as providing a safe, clean and convenient venting means when the contents are reheated by a consumer in the unopened container 10. The curled free ends 18 and 38 act in a springlike fashion to bleed off internal pressure developed from heating along their interface which, without a significant internal pressure, serve as an effective compressive seal. Therefore, the container may be safely autoclaved without bursting or distortion from internal pressure buildup. Also the container may be heated by the consumer without opening or creating venting means through which the heated contents may splatter onto the oven or other heating surfaces. This is made possible since the material vented through the curled portion 48 is mostly steam with little particulate matter and since there is no direct access outwardly for the contents and the venting can take place around the full periphery of the container end inwardly and/or upwardly.

Figure 23:
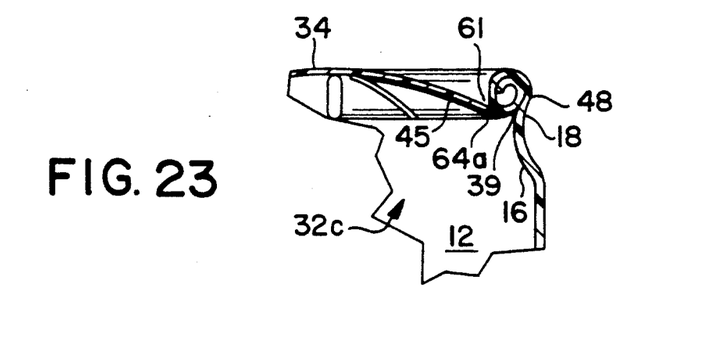
FIG. 23 is similar to FIG. 22, and wherein a sealant is provided between adjacent lid and the curled free end portion of the container body.

FIG. 23 illustrates another embodiment of the can end 32 of the invention for use with vacuum packaged products. In this embodiment the can end 32c is configured as in FIGS. 22 except that the lid transition portion 39 directly abuts the body free end 18 adjacent the side wall projection 16. When such a can end 32c is joined to can body 12 as previously described and is subject to the stresses of an internal vacuum the surface of the lid 34 is thrust downwardly creating a leveraged thrust radially on its periphery 36 to significantly increase its sealing pressure directly on the can body projection 16 and the adjacent can body free end 18 below the curled portion 48. Another feature of the invention for vacuum packed products is illustrated in FIG. 23 wherein sealant 61 is applied to the crevice 64a formed by the curled portion 48 and the can end 32c prior to cooling of the container after autoclaving or hot filling so that upon cooling and the development of an internal vacuum the sealant 61 will be drawn into the crevice 64a wherever a leak exists thereby enhancing the sealing integrity of the curled portion 48.

Figure 24:
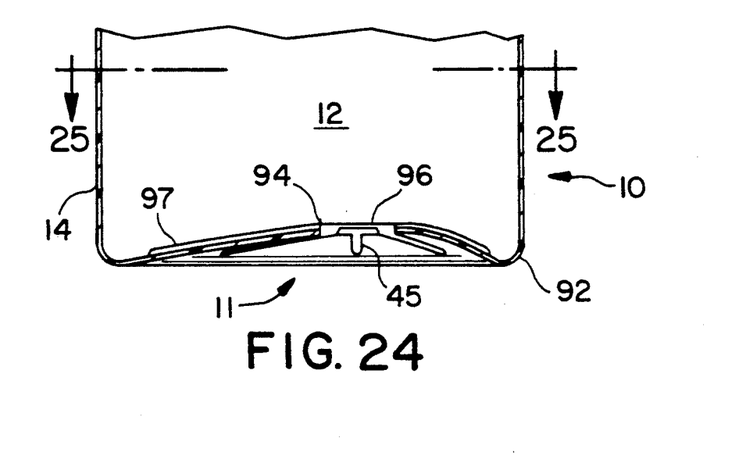
FIG. 24 is a longitudinal sectional view of the container body of FIG. 1, taken along the lines 24—24 thereof, and wherein the bottom of the container is d and includes lines of weakness or depressions for flexing of the domed portion.
Figure 25:
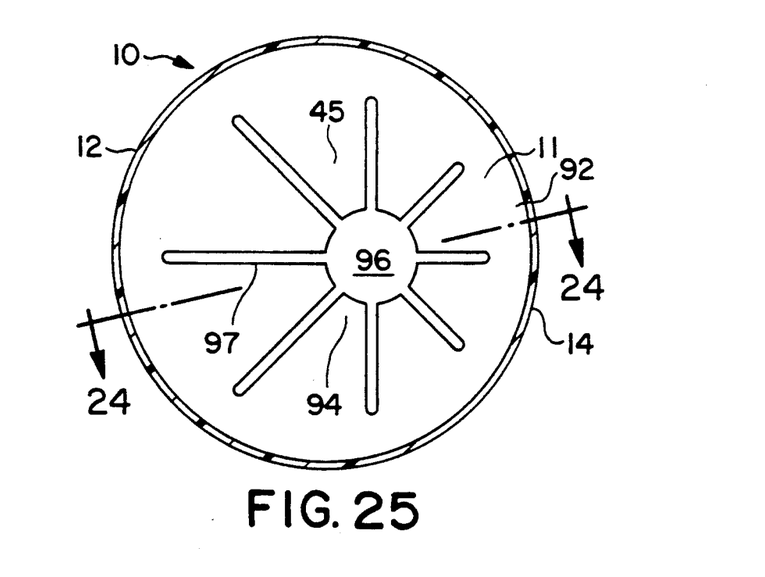
FIG. 25 is a plan view of FIG. 24.

Referring now to FIGS. 24 and 25 there is generally shown that the container 10 of FIGS. 1 and 2, can include an inwardly domed integral bottom 11. In addition, these figures illustrate an embodiment of the invention wherein the bottom 11 of container 10 is shaped to facilitate its easy reinversion after inversion when subjected to internal pressure or vacuum as often encountered during retorting. In this embodiment the bottom 11 is an integral part of can body 12 and has a curved transitional portion 92 therebetween and the central domed portion 94. The top 96 of the inwardly domed bottom portion 94 is located off center so that it has a greater span 97 in one direction than in other directions thereby creating an imbalance and a weakness to its structure thereat and a lesser resistance to the forces which create inversion (ie. internal pressure). When internal pressure within the can 10 builds up as when heated, the span 97 is easily pushed downwardly and once this occurs the remainder of the bottom 11 easily continues the inversion. When the container is cooled and an internal vacuum is developed, the bottom 11 reinverts itself readily, again because of its asymmetrical shape and its reduced structural strength. Alternatively the function of the bottom 11 and its ability to invert and reinvert readily can be achieved by creating a flat cross section or a reverse curvature to a radial segment of an otherwise symmetrical dome shape, thereby creating the weakened structure even when the top 96 is not off center. Another embodiment achieves the weakened structure by the inclusion of radial lines of weakness which reduce the hoop strength of the domed structure, as described in FIGS. 17 to 20. In this case the radial lines of weakness 45 can be continued across the central, top portion 96 to create the least resistance to inversion. While each of the aforementioned means to create a structural imbalance or weakening and thereby a lessened resistance to inversion may be employed independently, they may also be employed simultaneously as shown in FIGS. 24 and 25 to achieve optimum results. In yet another embodiment of the invention the inversion weakened construction of FIGS. 24 and 25 may be employed on the container side wall or its top or lid portion. In still further embodiments of the invention the dome shape of FIGS. 24 and 25 may be truncated or have a base of another shape than circular, such as square or rectangular.

Also, the weakened portion 94 can be employed as a vacuum indicator for hot filled containers. For example, the dome 94 can be outwardly directed when filled and inwardly directed when a given level of internal vacuum is developed on cooling. Further, the resistance to inversion may be varied to correspond to various levels of vacuum in a plurality of such portions 94 to indicate the various levels of vacuum developed with the container. While FIGS. 24 and 25 generally illustrate an integral domed bottom 11, the container or cans of the invention may have a variety of end configurations, including a double wall curled plastic end as described and shown herein at each end of the container or can.

Thus, the invention in its broader aspects is not limited to the specific described embodiments and departures may be made therefrom within the scope of the accompanying claims without departing from the principles of the invention and without sacrificing its chief advantages.

I claim:

1. A container comprising:
   a body having a free end of plastic,
   an end portion having a central portion and a peripheral skirt including a free end of plastic, and
   said free ends being in juxtaposition and continuously flexed to form a curled double wall seam of plastic which joins said end portion to said body, and wherein at least one of said curled free ends of plastic includes developed stress along its length which causes said free ends to maintain engagement therebetween wherein during curling said at least one free end which includes developed stress is maintained at a temperature below its softening point.

2. The container of claim 1, wherein said end portion has a central portion and a peripheral skirt including said free end of plastic.

3. The container of claim 1, wherein said curled double wall free ends of plastic have a cross sectional shape of a coil.

4. The container of claim 1, wherein said central portion has a concave cross sectional shape.

5. The container of claim 1, wherein the double wall curled free ends of plastic are tapered.

6. The container of claim 1, wherein said body includes an inwardly extending projection spaced from said free end thereof, for positioning said end portion within said body.

7. The container of claim 1, wherein said free ends have different levels of strength or strain so that one of said free ends is shaped by and in intimate contact with the other of said free ends.

8. The container of claim 1, wherein the free end of said end portion is force fitted within the free end of said container body.

9. The container of claim 1, wherein the double wall curled free ends of plastic are crimped creased or compressed.

10. The container of claim 1, wherein the double wall curled free ends of plastic are bonded together or to the central portion of said end portion or to said container body.

11. The container of claim 1, wherein said curled double wall of plastic includes means for venting pressure when the pressure within the container reaches predetermined levels.

12. The container of claim 1, wherein said central portion has a curved configuration which can be flexed by pressure or vacuum within the container to exert a compressive component against the transitional portion between the can body and its free end.

13. The container of claim 12, wherein said central portion is curved and exerts a compressive component against said double wall of plastic as a result of internal pressure or vacuum.

14. The container of claim 13, wherein said central portion of said end portion includes radial depressions of lines of weakness so that the central portion of the end portion can exert a compressive component on the curled configuration or transitional portion between the can body and its free end in response to the pressure or vacuum within the container.

15. The container of claim 1, wherein said end portion includes a concave transition portion between said integral with said peripheral skirt and said central portion to retain said double wall of plastic.

* * * * *